United States Patent
Dubey et al.

(10) Patent No.: US 10,457,819 B2
(45) Date of Patent: Oct. 29, 2019

(54) DIRT PICK-UP RESISTANT SILICONE COATING COMPOSITION

(71) Applicant: Mornentive Performance Materials Inc., Waterford, NY (US)

(72) Inventors: Mayank Dubey, Bangalore (IN); Anubhay Saxena, Bangalore (IN); Indumathi Ramakrishnan, Bangalore (IN); Sumi Dinkar, Bangalore (IN)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

(21) Appl. No.: 15/415,228

(22) Filed: Jan. 25, 2017

(65) Prior Publication Data

US 2017/0210913 A1 Jul. 27, 2017

Related U.S. Application Data

(60) Provisional application No. 62/287,647, filed on Jan. 27, 2016.

(51) Int. Cl.

| C09D 5/16 | (2006.01) |
|---|---|
| C09D 183/04 | (2006.01) |
| C09D 171/02 | (2006.01) |
| C08G 65/336 | (2006.01) |
| C09D 183/06 | (2006.01) |
| C09D 183/12 | (2006.01) |
| C08K 3/34 | (2006.01) |
| C08G 77/04 | (2006.01) |
| C08G 77/14 | (2006.01) |
| C08G 77/16 | (2006.01) |
| C08G 77/18 | (2006.01) |
| C08G 77/46 | (2006.01) |

(52) U.S. Cl.
CPC .......... *C09D 5/1675* (2013.01); *C08G 65/336* (2013.01); *C09D 171/02* (2013.01); *C09D 183/04* (2013.01); *C09D 183/06* (2013.01); *C09D 183/12* (2013.01); *C08G 77/04* (2013.01); *C08G 77/14* (2013.01); *C08G 77/16* (2013.01); *C08G 77/18* (2013.01); *C08G 77/46* (2013.01); *C08K 3/34* (2013.01)

(58) Field of Classification Search
CPC .. C09D 5/1675; C09D 183/06; C09D 183/12; C09D 171/02; C08G 65/336
See application file for complete search history.

(56) References Cited

U.S. PATENT DOCUMENTS

| 3,327,951 A | 6/1967 | Bose |
|---|---|---|
| 3,642,692 A | 2/1972 | Hartlage et al. |
| 4,131,588 A | 12/1978 | Smith, Jr. |
| 4,476,278 A | 10/1984 | Shimizu |
| 4,585,670 A | 4/1986 | Liu |
| 4,780,338 A | 10/1988 | Saad et al. |
| 4,870,130 A | 9/1989 | Achtenberg et al. |
| 5,929,160 A | 7/1999 | Krepski et al. |
| 6,602,964 B2 | 8/2003 | Huang et al. |
| 7,223,821 B2 | 5/2007 | Okuhira et al. |
| 7,807,744 B2 | 10/2010 | Barnes et al. |
| 8,372,515 B2 | 2/2013 | Byrne et al. |
| 8,420,725 B2 | 4/2013 | Iwao et al. |
| 8,940,397 B2 | 1/2015 | Mallesha et al. |
| 9,012,558 B2 | 4/2015 | Lucas |
| 2004/0176517 A1 | 9/2004 | Hatanaka et al. |
| 2006/0194067 A1 | 8/2006 | Beger et al. |
| 2006/0293480 A1 | 12/2006 | Landon et al. |
| 2007/0066768 A1 | 3/2007 | Gauthier et al. |
| 2007/0160781 A1 | 7/2007 | Landon et al. |
| 2007/0173597 A1 | 7/2007 | Williams et al. |
| 2008/0090010 A1* | 4/2008 | Zhang .................... B82Y 30/00 427/372.2 |
| 2008/0242763 A1 | 10/2008 | Ramakrishnan et al. |
| 2009/0005498 A1 | 1/2009 | Lin et al. |
| 2009/0124751 A1 | 5/2009 | Lucas et al. |
| 2010/0168304 A1 | 7/2010 | Nagato et al. |
| 2011/0112221 A1 | 5/2011 | Lejeune et al. |
| 2011/0124800 A1 | 5/2011 | Onodera et al. |
| 2011/0178220 A1 | 7/2011 | Davio et al. |
| 2011/0212333 A1 | 9/2011 | Matsuzawa et al. |
| 2011/0237734 A1 | 9/2011 | Ramakrishnan et al. |
| 2012/0214902 A1 | 8/2012 | Detemmerman et al. |
| 2013/0012645 A1 | 1/2013 | Lucas |
| 2013/0040058 A1 | 2/2013 | Friedel et al. |
| 2013/0108882 A1 | 5/2013 | Stuart et al. |
| 2013/0209921 A1* | 8/2013 | Qiu ....................... G03F 7/0757 430/5 |
| 2014/0272437 A1 | 9/2014 | Webb et al. |
| 2015/0031806 A1 | 1/2015 | Lim et al. |
| 2015/0159036 A1 | 6/2015 | Murugesan et al. |
| 2015/0299515 A1* | 10/2015 | Tanino ................. C09D 183/06 524/102 |

FOREIGN PATENT DOCUMENTS

| EP | 0229490 B1 | 7/1987 |
|---|---|---|
| EP | 0229490 B1 * | 6/1992 |
| EP | 0565093 A1 | 10/1993 |
| EP | 0703201 A1 | 3/1996 |
| EP | 2921538 A1 * | 9/2015 |
| JP | 8325466 A | 12/1996 |
| JP | 2014196418 A | 10/2014 |
| WO | 0142365 A1 | 6/2001 |
| WO | 2014051674 A1 | 4/2014 |
| WO | 2014126643 A1 | 8/2014 |

OTHER PUBLICATIONS

International Search Report and Written Opinion from PCT/US2017/014899 dated Apr. 10, 2017.

* cited by examiner

*Primary Examiner* — Peter D. Mulcahy
(74) *Attorney, Agent, or Firm* — James C. Abruzzo

(57) ABSTRACT

There is provided herein an elastomeric coating composition containing (a) at least one condensation polymerization-effective polymer bearing two or more silicon atoms; (b) a surface wetting agent, (c) a filler; (d) a condensation catalyst; and, (e) optionally, one or more crosslinking agents. There are also provided architectural coatings including the same, as well as single coat anti-dirt, and/or anti-stain, and/or anti-fouling coatings including the same.

21 Claims, No Drawings

DIRT PICK-UP RESISTANT SILICONE COATING COMPOSITION

This application claims priority to Provisional U.S. Patent Application No. 62/287,647 which was filed on Jan. 27, 2016, the entire contents of which are incorporated herein by reference.

FIELD OF THE INVENTION

There is provided herein a silicone coating composition, more specifically a silicone coating composition that exhibits lower dirt pick up than conventional silicone coatings.

BRIEF DESCRIPTION OF THE RELATED ART

Coatings have been used widely in many fields. In the use of silicone elastomeric coatings, properties such as water repellency, durability, flexibility, and UV and thermal crack resistance are important in the various applications in which they are employed. Due to the low glass transition temperature (Tg) of silicone, elastomeric coatings containing silicone have a softer outer surface which leads to tackiness and increased dirt pick-up.

The traditional way to improve dirt pickup resistance is to raise the Tg of the coating, essentially creating a harder outer surface at the cost of elongation. One of the challenges has therefore been obtaining an optimal level of hardness without compromising elongation values that are both important in architectural coating applications.

Other ways of improving dirt pickup resistance have included using highly cross-linked polymers, resulting in a low-tack surface that impedes dirt penetration. While this method is commonly used in automotive coating applications and architectural organic coatings, silicone elastomeric coatings provide unique challenges, including the need to retain a minimum level of elongation.

Thus, there remains a need for a silicone-based elastomeric coating composition which not only improves dirt pick resistance but simultaneously also addresses the other issues that conventional silicone-based elastomeric coating compositions have yet to satisfactorily resolve.

SUMMARY OF THE INVENTION

In accordance with the present invention, in an aspect there is provided an elastomeric coating composition comprising:
  a) at least one condensation polymerization-effective polymer bearing two or more silicon atoms;
  b) a surface wetting agent selected from the group consisting of a polyalkylene oxide-containing silane which contains an aliphatic hydrocarbon moiety between a silicon atom and a polyalkylene oxide moiety in the polyalkylene oxide-containing silane, a heteroatom-containing silane, a functionalized organosiloxane and, combinations thereof;
  c) at least one filler;
  d) a condensation catalyst; and,
  e) optionally, one or more crosslinking agents.

In addition there is provided herein a method of making an elastomeric coating composition comprising combining components (a)-(d) and optionally (e).

DETAILED DESCRIPTION OF THE INVENTION

In an embodiment of the present invention, the elastomeric coating composition contains polyether silane in combination with filler, such as layered structured filler, e.g., mica. The presence of both the polyether silane and the filler in the coating composition provides improved dirt pick-up resistance as compared to solely polyether silane or solely filler.

In an embodiment, the coating compositions of the present invention can be formulated as elastomeric coating compositions. The term elastomeric according to the present invention means that the composition when applied to a substrate can provide for effective UV, weather and water protection without excessive hardening of the coating over time which can result in visible pitting, cracking and flaking of the coating from the substrate. Such elastomeric properties of the coating can be appreciated by those skilled in the art by visible inspection of the coating. In one embodiment, the elastomeric advantages of the coating composition can be provided when the coating provides the requisite levels of modulus and elongation, as well as the requisite levels of stability and UV resistance as described herein.

Other than in the examples or where otherwise indicated, all numbers expressing amounts of materials, reaction conditions, time durations, quantified properties of materials, and so forth, stated in the specification and claims are to be understood as being modified in all instances by the term "about" whether or not the term "about" is used in the expression.

It will be understood that any numerical range recited herein includes all sub-ranges within that range and any combination of the various endpoints of such ranges or sub-ranges, be it described in the examples or anywhere else in the specification.

It will also be understood herein that any of the components of the invention herein as they are described by any specific genus or species detailed in the examples section of the specification, can be used in one embodiment to define an alternative respective definition of any endpoint of a range elsewhere described in the specification with regard to that component, and can thus, in one non-limiting embodiment, be used to supplant such a range endpoint, elsewhere described.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product or final material.

In describing the products of the instant invention as a reaction product of initial materials reference is made to the initial species recited and it is to be noted that additional materials may be added to the initial mixture of synthetic precursors. These additional materials may be reactive or non-reactive. The defining characteristic of the instant invention is that the reaction product is obtained from the reaction of at least the components listed as disclosed. Non-reactive components may be added to the reaction mixture as diluents or to impart additional properties unrelated to the properties of the composition prepared as a reaction product. Thus for example particulate solids such as pigments may be dispersed into the reaction mixture, before during or after reaction to produce a reaction product composition that additionally comprises the non-reactive component, e.g., a pigment. Additional reactive components may also be added; such components may react with the initial reactants or they may react with the reaction product; the phrase "reaction product" is intended to include those possibilities as well as including the addition of non-reactive components.

As used herein, the expression "comprising" or "comprises" shall also be understood to include the more restrictive transitional expressions "consisting essentially of" and "consisting of" which shall contain the components (a)-(d) and optionally (e) as described herein, as well as any optional additives as described herein, or in more specific embodiment just components (a)-(d) and optionally (e).

As used herein in reference to a hydrocarbon radical, the term "monovalent" means that the radical is capable of forming one covalent bond per radical, the term "divalent" means that the radical is capable of forming two covalent bonds per radical and the term "trivalent" means that the radical is capable of forming three covalent bonds per radical. Generally, a monovalent radical can be represented as having been derived from a saturated hydrocarbon compound by conceptual removal of one hydrogen atom from the compound, a divalent radical can be represented as having been derived from a saturated hydrocarbon compound by conceptual removal of two hydrogen atoms from the compound and a trivalent radical can be represented as having been derived from a saturated hydrocarbon compound by conceptual removal of three hydrogen atoms from the compound. For example, an ethyl radical, that is, a —$CH_2CH_3$ radical, is a monovalent radical; a dimethylene radical, that is, a —$(CH_2)_2$— radical, is a divalent radical and an ethanetriyl radical, that is,

radical, is a trivalent radical, each of which can be represented as having been derived by conceptual removal of one or more hydrogen atoms from the saturated hydrocarbon ethane.

As used herein, the terminology "hydrocarbon radical", "hydrocarbon group" or "hydrocarbon moiety" each equally means a straight chain or branched hydrocarbon radical, preferably containing from 1 to 6 carbon atoms per radical, which may be saturated or unsaturated and which may be optionally substituted or interrupted with one or more atoms or functional groups, such as, for example, carboxyl, cyano, hydroxy, halo and oxy. Suitable monovalent hydrocarbon radicals may include, for example, alkyl, alkenyl, alkynyl, hydroxyalkyl, cyanoalkyl, carboxyalkyl, alkyloxy, oxaalkyl, alkylcarbonyloxaalkylene, carboxamide and haloalkyl, such as, for example, methyl, ethyl, sec-butyl, tert-butyl, ethenyl, propenyl, butynyl, hydroxypropyl, cyanoethyl, butoxy, carboxymethyl, chloromethyl and 3,3,3-fluoropropyl.

Suitable divalent hydrocarbon radicals include, for example, linear or branched alkylene radicals, such as, for example, methylene, dimethylene, trimethylene, ethylethylene, 2-methyltrimethylene, 2,2-dimethyltrimethylene and linear or branched oxalkylene radicals such as, for example, methyleneoxypropylene.

Suitable trivalent acyclic hydrocarbon radicals include, for example, alkanetriyl radicals, such as, for example, 1,1,2-ethanetriyl, 1,2,4-butanetriyl, 1,2,8-octanetriyl, 1,2,4-cyclohexanetriyl and oxaalkanetriyl radicals such as, for example, 1,2,6-triyl-4-oxahexane.

As used herein the term "alkyl" means a saturated straight or branched monovalent hydrocarbon radical. In a preferred embodiment, monovalent alkyl groups are selected from linear or branched alkyl groups containing from 1 to 6 carbons per group, such as, for example, methyl, ethyl, propyl, iso-propyl, n-butyl, iso-butyl, sec-butyl, tert-butyl, pentyl and hexyl.

As used herein the term "alkenyl" means a straight or branched monovalent terminally unsaturated hydrocarbon radical, preferably containing from 2 to 6 carbon atoms per radical, such as, for example, vinyl, ethenyl, allyl, 2-propenyl, 3-butenyl, and 5-hexenyl.

In one non-limiting embodiment herein, some specific non-limiting examples of hydrocarbon radicals that may be used herein are methyl, ethyl, vinyl, allyl, n-propyl, iso-propyl, n-butyl, isobutyl, tert-butyl, n-pentyl, iso-pentyl, neopentyl and tert-pentyl; hexyl, such as the n-hexyl group; and the 2,2,4-trimethylpentyl group.

In an embodiment of the present invention, component (a) is a condensation polymerization-effective polymer bearing two or more silicon atoms. As used herein, the expression "condensation polymerization-effective" is understood to mean a polymer that is capable of being condensed by a condensation reaction. Condensation reactions and reaction conditions such as reaction time, temperature and pressure are well known by those skilled in the art.

In an embodiment, the condensation polymerization-effective polymer bearing two or more silicon atoms (a) is preferably a silane and/or a silicone compound, in another embodiment, more preferably a silicone compound, in yet another embodiment, even more preferably a linear silicone compound, and in still yet another embodiment, most preferably a completely hydroxyl-terminated and/or alkoxy-terminated silicone compound. The condensation polymerization-effective polymer bearing two or more silicon atoms (a) can more preferably contain at least three silicon atoms, and more preferably from about 2 to about 30,000 silicon atoms, even more preferably from about 2 to about 20,000 silicon atoms, yet even more preferably from about 2 to about 10,000 silicon atoms, or where any of said ranges have an upper end point of any one of 5,000; 3,000, 1,000, 500, 100 or 50 silicon atoms. In an embodiment, any of said ranges of silicon atoms can comprise ranges of silicone units.

In an embodiment, the at least one condensation polymerization-effective polymer bearing two or more silicon atoms (a) is of the general formula (I):

$$M^1{}_aM^2{}_bM^3{}_cM^4{}_dD^1{}_eD^2{}_fD^3{}_gD^4{}_h \quad (I)$$

wherein:
$M^1 = R^1R^2R^3SiO_{1/2}$
$M^2 = R^4R^5R^6SiO_{1/2}$
$M^3 = R^7R^8R^9SiO_{1/2}$
$M^4 = R^{10}R^{11}R^{12}SiO_{1/2}$
$D^1 = R^{13}R^{14}SiO_{2/2}$
$D^2 = R^{15}R^{16}SiO_{2/2}$
$D^3 = R^{17}R^{18}SiO_{2/2}$
$D^4 = R^{19}R^{20}SiO_{2/2}$
and, $R^1$ and $R^{13}$ are each independently an aliphatic group, or an aromatic group having from 1 to 60 carbon atoms, more preferably from 1 to 20 carbon atoms, even more preferably from 1 to about 8 carbon atoms and most preferably from 1 to about 4 carbon atoms, an OH or —H or $OR^{25}$, where $R^{25}$ is an aliphatic group or an aromatic group having from 1 to 60 carbon atoms, more preferably from 1 to 20 carbon atoms, even more preferably from 1 to about 8 carbon atoms and most preferably from 1 to about 4 carbon atoms;

$R^2$, $R^3$, $R^5$, $R^6$, $R^8$, $R^9$, $R^{10}$, $R^{11}$, $R^{12}$, $R^{14}$, $R^{16}$, $R^{18}$, $R^{19}$ and $R^{20}$ are each independently an aliphatic group, or an aromatic group having from 1 to 60 carbon atoms, more preferably from 1 to 20 carbon atoms, even more preferably from 1 to about 8 carbon atoms and most preferably from 1 to about 4 carbon atoms;

$R^4$ and $R^{15}$ are each independently of the formula:

where $R^{26}$ is a hydrogen or an aliphatic group, or an aromatic group having from 1 to 60 carbon atoms, more preferably from 1 to 20 carbon atoms, even more preferably from 1 to about 8 carbon atoms and most preferably from 1 to about 4 carbon atoms, n equals 0 to 6, preferably any one of 2, 3 or 4, o is 0 to 100, preferably 1 to about 50 more preferably from about 1 to about 30 and most preferably from about 1 to about 18, p is 0 to 100, preferably 0 to about 50, more preferably from about 0 to about 30 and most preferably from about 0 to about 18, and q is 0 to 50, preferably 0 to about 18, more preferably from about 0 to about 8 and most preferably from about 0 to about 1, provided o+p+q≥0, more specifically provided o+p+q≥40, even more preferably o+p+q≥18 and most preferably o+p+q≥8;

$R^7$ and $R^{17}$ are each independently a branched, linear or cyclic, saturated or unsaturated alkyl group having from 4 to 36 carbon atoms, more preferably 1 to 16 and most preferably 1 and the subscripts a, b, c, d, e, f, g, h are each independently zero or a positive integer, and provided that a+b+c+d+e+f+g+h≥2, more preferably, 2 to 30,000, even more preferably 2 to 10,000 and most preferably wherein a+b+c+d+e+f+g+h=2 to any one endpoint of 5,000, 3,000, 1,000, 500, 100 or 50, and $$a+b+c+d=2,$$

and $a+e≥2$, the polymer of formula (I) contains at least two groups selected from —OH, —$OR^{25}$ and combinations thereof, In an embodiment, the at least one condensation polymerization-effective polymer bearing two or more silicon atoms (a) is a silanol-terminated polydiorganosiloxane wherein the organo moieties are each independently alkyl groups from 1 to about 6 carbon atoms.

In another embodiment, the at least one condensation polymerization-effective polymer bearing two or more silicon atoms (a) is a mixture of two or more silanol-terminated polydiorganosiloxanes wherein at least one polydiorganosiloxane has a viscosity of from about 100 cps to about 150,000 cps, preferably from about 1,000 to about 5,000 cps and even more preferably from about 1,500 to about 4,000, and the at least one other polydiorganosiloxane has a viscosity of from about 10,000 cps to about 80,000 cps, preferably from about 15,000 to about 50,000 and more preferably from about 15,000 to about 40,000. Each recitation of viscosity herein is understood to be measured at 25 degrees Celsius unless stated otherwise.

In yet another embodiment, the at least one condensation polymerization-effective polymer bearing two or more silicon atoms (a) is a hydroxyl-terminated polydimethylsiloxane, an alkoxy-terminated polydimethylsiloxane, or a polydimethylsiloxane having a combination of the hydroxyl and alkoxy termination thereof.

In an embodiment, the surface wetting agent (b) of the present invention may be selected from the group consisting of a polyalkylene oxide-containing silane which contains an aliphatic hydrocarbon moiety between a silicon atom and a polyalkylene oxide moiety in the polyalkylene oxide-containing silane, a heteroatom-containing silane and, combinations thereof. The polyalkylene oxide moiety in the polyalkyleneoxide-containing silane is a polyethylene oxide and/or polypropylene oxide containing silane, preferably a polyethylene oxide containing silane.

In an embodiment, the surface wetting agent (b) is a polyalkylene oxide-containing silane selected from the general formulae (II) and/or (III):
wherein formula (II) is:

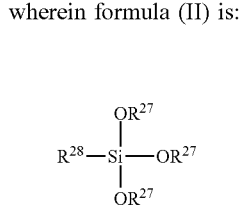

wherein $R^{27}$ is independently selected from an alkyl group having from 1 to about 12 carbon atoms, preferably from 1 to about 8 carbon atoms, and most preferably from 1 to about 6 carbon atoms;
$R^{28}$ is a moiety selected from:

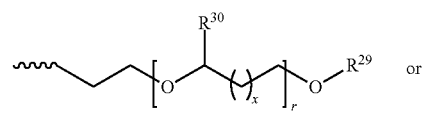

-continued

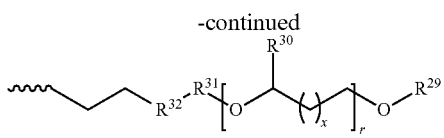

wherein:
∿∿∿ represents a bond to the silicon atom of the structure of formula (II);
$R^{29}$ is independently selected from a hydrogen or an alkyl group having from 1 to 4 carbon atoms, preferably methyl, or —$COR^{33}$; where $R^{33}$ is independently selected from hydrogen, or an alkyl group having 1 to about 16 carbon atoms, preferably from 1 to about 12 carbon atoms, more preferably from 1 to about 8 carbon atoms, and most preferably from 1 to about 6 carbon atoms;
$R^{30}$ is independently selected from hydrogen, or an alkyl group having from 1 to 4 carbon atoms, more preferably hydrogen or methyl, and even more preferably hydrogen;
$R^{31}$ is independently selected from a divalent alkylene group having from 1 to 4 carbon atoms, more preferably methylene or ethylene;
$R^{32}$ is independently selected from a divalent urethane, acrylamide, amide, or urea group; and,
r is from 1 to about 100, preferably from 1 to about 50 and even more preferably from 1 to about 25, and x is zero or 1, preferably zero;
Formula (III):

where $R^{27}$ is as previously defined;
Z is independently selected from a divalent urethane, acrylamide, amide, or urea group; s and t are independently integers from 0 to 2, preferably 1;
L is independently selected from a divalent aliphatic linear hydrocarbon group having from 2 to about 15 carbon atoms, preferably 3 to 4 and may optionally have an oxygen or nitrogen atom at one or both valences;
$R^{34}$ is defined by the general formula (IV):

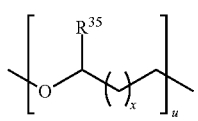

wherein $R^{35}$ is independently selected from hydrogen or an alkyl group having from 1 to 4 carbon atoms, preferably hydrogen or methyl, even more preferably hydrogen;
x is as previously defined; and,
u is an integer from 1 to about 100, more preferably from 1 to about 50 and even more preferably from 1 to about 25.
In one embodiment, the surface wetting agent (b) is SILQUEST A-1230 silane available from Momentive Performance Materials Inc.
In an embodiment, the wetting agent (b) can be a polyether silane wherein the polyether silane is in the absence of polyurethane moieties. In another embodiment, the wetting agent (b) is a polyether silane in the absence of halogen moieties and/or heteroatoms, such as O, N and S and/or epoxy group(s).

In an embodiment, the surface wetting agent (b) is selected from the group consisting of a functionalized organosiloxane of the general formula (V):

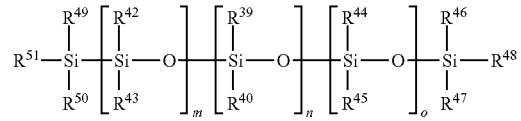

wherein $R^{39}$, $R^{42}$, $R^{43}$, $R^{44}$, $R^{45}$, $R^{46}$, $R^{47}$, $R^{49}$ and $R^{50}$ are independently selected from hydrogen, an alkyl group containing from 1 to 10 carbon atoms, or an alkoxy group containing from 1 to 10 carbon atoms;
$R^{40}$ is selected from hydrogen, an alkyl group containing from 1 to 10 carbon atoms or alkoxy group containing from 1 to 10 carbon atoms, a heteroatom-containing compound containing from 1 to 10 carbon atoms, wherein m, n and o are each independently integers from 0 to about 1000; or a compound of the general formula (VII):

$$R_j^{41}-Z-R_k^{41}-Z-R_l^{41} \quad (VII)$$

wherein $R^{41}$ is independently selected from hydrogen, or an alkyl group containing from 1 to 10 carbon atoms or a hetero atom containing compound having from 1 to 10 carbon atoms;
Z is heteroatom, and
$R^{48}$ and $R^{51}$ are independently hydrogen or an alkyl or alkoxy group having from 1 to 10 carbon atoms or an substituted or unsubstituted aromatic compound containing from 6 to 20 carbon atoms; wherein
j, k and l are each independently an integer from 1 to 10;
Some non-limiting examples of functionalized siloxanes suitable for use in the present invention include the following structures:

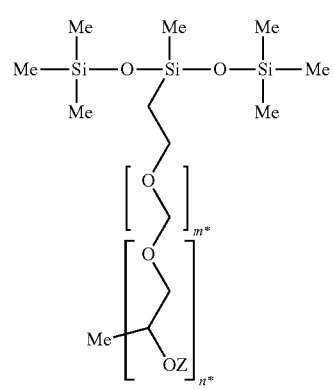

Polyether Functionalized Trisiloxane wherein Me is understood to be methyl; Z is an alkyl group containing 1 to 4 carbon atoms and m* and n* are each 0 to 10;

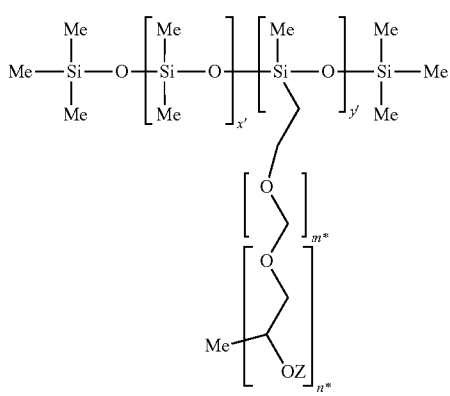

Polyether Functionalized PDMS wherein Z is an alkyl group having from 1 to 4 carbon atoms, $m^*$ and $n^*$ are each 0-10, and $x'+y'$ is 1-20;

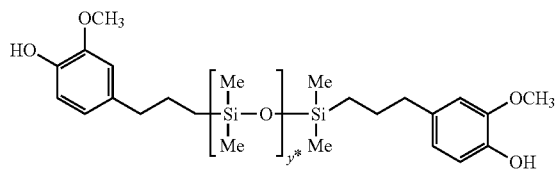

Eugenol Stopped PDMS wherein $y^*$ is from 1 to 60;

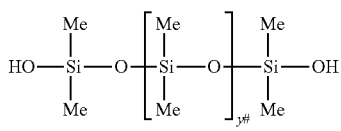

Hydroxy Stopped PDMS wherein $y\#$ is from 10 to 1,000;

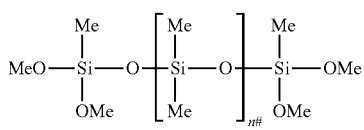

Dimethoxy-Methyl Stopped PDMS wherein $n\#$ is from 1 to 20;

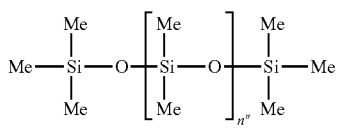

Methyl Stopped PDMS methyl-stopped PDMS, wherein $n''$ is from 10 to 300.

In one embodiment, the surface wetting agent (b) is one or more selected from the group consisting of an ethylene oxide and/or propylene oxide containing silane;

an isocyanato silane chosen from tris[3-(trimethoxysilyl)propyl]isocyanurate or 3-isocyanatopropyltrimethoxysilane; and, a functional siloxane selected from the group consisting of polyether-functionalized polydimethysiloxane, polyether-functionalized trisiloxane, low molecular weight-terminated polydimethysiloxane having viscosity from 20,00 to 10,000 cps, high molecular weight-terminated polydimethylsiloxane having viscosity from 30,000 to 40,000 cps, eugenol-terminated polydimethylsiloxane, dimethoxy-methyl-terminated polydimethylsiloxane, methyl-terminated polydimethylsiloxane, and combinations thereof.

The at least one filler (c) of the present invention can be any filler that increases the hardness of the composition, but is more preferably a layered structured filler, even more preferably a wet-processed structural filler, although dry-processed structural fillers are also contemplated. Suitable examples of such fillers can be wet-processed fillers such as made by the process described in U.S. Pat. No. 3,327,951 and/or the dry or wet-processed fillers made by the process described in *Industrial Minerals and Rocks*, 7th Edition, Edited by Kozel et al., Society for Mining, Metallurgy, and Exploration Inc., 2006, pp. 647-650, the contents of which are each incorporated by reference herein in their entireties.

In another non-limiting embodiment, the filler (c) can be selected from the group consisting of clays, nano-clays, organo-clays, ground calcium carbonate, precipitated calcium carbonate, colloidal calcium carbonate, calcium carbonate treated with compounds containing a stearate moiety or stearic acid, fumed silica, precipitated silica, crushed quartz, ground quartz, alumina, aluminum hydroxide, ceramic and glass spheres, titanium hydroxide, kaolin, bentonite montmorillonite, diatomaceous earth, iron oxide, PTFE powder, carbon black and graphite, talc, mica, pumice, wollastonite, dolomite, feldspar and combinations thereof. In an embodiment, the filler (c) may be mica.

In a further embodiment, the surface wetting agent (b) is a (poly)ethylene oxide or (poly)propylene oxide containing silane or a combination of the two, and the filler is mica.

The condensation catalyst (d) useful in the present invention may include metal condensation catalysts wherein the metal is selected from the group consisting of tin, titanium, zirconium, lead, iron cobalt, antimony, manganese, bismuth and zinc compounds.

In one embodiment of the present invention, tin compounds may be used as condensation catalysts. Suitable tin compounds may include, but are not limited to dibutyltindilaurate, dibutyltindiacetate, dibutyltindimethoxide, tinoctoate, isobutyltintriceroate, dibutyltinoxide, solubilized dibutyl tin oxide, dibutyltin bis-diisooctylphthalate, bis-tripropoxysilyl dioctyltin, dibutyltin bis-acetylacetone, silylated dibutyltin dioxide, carbomethoxyphenyl tin trisuberate, isobutyltin triceroate, dimethyltin dibutyrate, dimethyltin di-neodecanoate, triethyltin tartarate, dibutyltin dibenzoate, tin oleate, tin naphthenate, butyltintri-2-ethylhexylhexoate, and tinbutyrate, combinations thereof and the like.

In still another embodiment, suitable titanium compounds may also include chelated titanium compounds, for example, 1,3-propanedioxytitanium bis(ethylacetoacetate); di-isopropoxytitanium bis(ethylacetoacetate); and tetra-alkyl titanates, for example, tetra n-butyl titanate and tetra-isopropyl titanate. In an embodiment, the condensation catalyst (d) is di-isopropyl titanium bisacetylacetonate.

The crosslinking agent (e) of the present invention can be any crosslinking agent commonly used in elastomeric coatings such as the non-limiting example of alkoxysilanes, preferably polyalkoxysilanes In an embodiment, the optional crosslinking agent (e) has the general formula (VIII):

$$(R^A)_{x''}R^B_{y''}Si \quad (VIII)$$

wherein $R^A$ and $R^B$, are independently chosen from monovalent $C_1$ to $C_{60}$ hydrocarbon radicals, such as methyl, ethyl, propyl, isopropyl, butyl, tert-butyl, sec-butyl, and the like, or an alkoxy group having from 1 to 60 carbon atoms, and wherein x" is from 2 to 4 and y" is from 0 to 2, provided that x"+y"=4.

The optional crosslinking agent (e) can be selected from the group consisting of alkoxy silane, epoxy silane, mercapto silane, acrylate silane, methacryloxy silane, vinyl silane, isocyanato silane, and combinations thereof.

An example of the polyalkoxysilane crosslinking agent (e) is methyltrimethoxysilane.

In an embodiment, component (a) is present in the elastomeric coating composition in an amount of from about 5 weight % to about 95 weight %, preferably from about 10 weight % to about 50 weight %, and more preferably from about 15 weight % to about 40 weight %, based on the total weight of the elastomeric coating composition.

In an embodiment, component (b) is present in the elastomeric coating composition in an amount of from about 0.01 weight % to about 15 weight %, preferably from about 0.05 weight % to about 10 weight %, and more preferably from about 0.1 weight % to 7 weight %, and component (c) is present in an amount of from about 2 weight % to about 20 weight %, preferably from about 3 weight % to about 10 weight % and more preferably from 5 weight % to about 15 weight %, based on the combined weight of components (b) and (c).

In another non-limiting embodiment, the weight ratios of components (b) and (c) can be in a range from about 1:300 to about 1:250, preferably from about 1:200 to about 1:80 and even more preferably from about 1:30 to about 1:20.

In an embodiment, component (d) is present in the elastomeric coating composition in an amount of from about 0.01 weight % to about 5 weight %, preferably from about 0.1 weight % to about 2.5 weight %, and even more preferably from 0.5 weight % to about 2 weight %, based on the total weight of the elastomeric coating composition.

In an embodiment, optional component (e), if present, is present in the elastomeric coating composition in an amount of from about 0.01 weight % to about 20 weight %, preferably from about 0.5 weight % to about 15 weight %, and even more preferably from about 1 weight % to about 10 weight %, based on the total weight of the elastomeric coating composition.

The elastomeric coating composition of the present invention has demonstrated a surprising and unexpected synergistic effect in dirt pick-up resistance without adversely affecting the other properties of the silicone coating by employing a combination of a polyether silane and a filler in the coating composition.

More specifically, synergistic effect that has been demonstrated by the elastomeric coating composition of the present invention is an increased level of dirt pick-up resistance of the elastomeric coating composition when both surface wetting agent (b) and filler (c) are employed in the elastomeric coating composition, which increased dirt pick up resistance is in excess of the sum of the total increase of dirt pick-up resistance which occurs when only surface wetting agent (b) or only filler (c) is used with the other components (a), (d) and optionally (e) of the elastomeric coating composition, i.e., the combination of (b) and (c) in the composition produces a level of dirt pick up resistance which is greater than the sum of just using (b) alone and just using (c) alone.

The elastomeric coating composition of the present invention may also include further additives such as solvents, adhesion promoters, pigments, anti-sagging agents, flame retardants, biocides, and the like.

In another embodiment, the adhesion promoter is an isocyanato silane such as an isocyanatosilane having the general formula (VI):

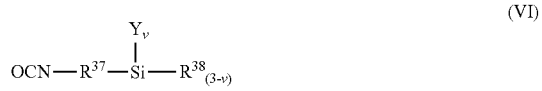

$$OCN-R^{37}-\underset{\underset{Y_v}{|}}{Si}-R^{38}_{(3-v)} \quad (VI)$$

wherein $R^{37}$ is a divalent alkylene group having from 1 to 10 carbon atoms, preferably from 1 to 3 carbon atoms, $R^{38}$ is a monovalent hydrocarbon residue having from 1 to 10 carbon atoms, preferably from 1 to 3 carbon atoms, each Y is independently a member selected from the group consisting of a halogen atom, an alkoxy group having from 1 to 10 carbon atoms, preferably from 1 to 3 carbon atoms, an acyloxy group having from 1 to 10 carbon atoms, preferably from 1 to 3 carbon atoms, and v is a number from 1 to 3. In an embodiment, v is 3 and Y is an alkoxy group, preferably a methoxy or an ethoxy group. In one embodiment, $R^{37}$ is a divalent propyl group.

Some non-limiting examples of such isocyanatosilanes include, but are not limited to, α-isocyanatomethyltrimethoxysilane, β-isocyanatoethyltrimethoxysilane, γ-isocyanatopropyltrimethoxysilane, α-isocyanatomethyltriethoxysilane, β-isocyanatoethyltriethoxysilane, Tris[3-(trimethoxysilyl)propyl]isocyanurate and μ-isocyanatopropyltriethoxysilane, and combinations thereof.

A non-limiting example of such an isocyanatosilane is 3-isocyanatopropyltrimethoxysilane.

In an embodiment, non-limiting examples of adhesion promoters include, but are not limited to, N-(beta-aminoethyl)-gamma-aminopropyltrimethoxysilane, N-ethyl-gammaaminoisobutyl trimethoxysilane, Bis-[gamma-(trimethoxysilyl)propyl]amine, Bis-[Gamma-(triethoxysilyl)propyl]amine, 1,3,5-tris (trimethoxysilylpropyl)isocyanurate, gamma-aminopropyltriethoxysilane, gamma-aminopropyltrimethoxysilane, aminopropyltrimethoxysilane, N-Phenyl-gamma-aminopropyltrimethoxysilane, triaminofunctionaltrimethoxysilane, gamma-aminopropylmethyldiethoxysilane, gamma-aminopropylmethyldiethoxysilane, methacryloxypropyltrimethoxysilane, methylaminopropyltrimethoxysilane, gamma-glycidoxypropylethyldimethoxysilane, gamma-glycidoxypropyltrimethoxysilane, gamma-glycidoxyethyltrimethoxysilane, beta-(3,4-epoxycyclohexyl)propyltrimethoxysilane, beta-(3,4-epoxycyclohexyl)ethylmethyldimethoxysilane, isocyanatopropyltriethoxysilane, isocyanatopropylmethyldimethoxysilane, beta-cyanoethyltrimethoxysilane, gamma-acryloxypropyltrimethoxysilane, gamma-methacryloxypropylmethyldimethoxysilane, 4-amino-3,3-dimethylbutyltrimethoxysilane, n-ethyl-3-trimethoxysilyl- 2-methylpropanamine, Tris[3-(trimethoxysilyl)propyl] isocyanurate and mixtures thereof.

The elastomeric coating compositions of the present invention may contain from 0.5 to 40 percent by weight of a pigment based on the total weight of the elastomeric coating composition. Pigments suitable for use in elastomeric coating compositions are generally known in the art, and can include those described in The Kirk-Othmer Encyclopedia of Chemical Technology, Volume 17, John Wiley & Sons, Pages 1049-1069, (1996), ISBN 0-471-52686-X, which is incorporated by reference in its entirety herein. Inorganic or organic color pigments can be used, although inorganic pigments may be preferred, because of their relatively low cost, better opacifying ability and their exterior durability properties compared to organic pigments. White, black, and other color pigments, such as titanium dioxide can be used. Extender pigments such as calcium carbonate, talc, clay, and silicon dioxide, are also suitable.

The compositions of the present invention may be utilized in a variety of forms: as liquid solutions, dispersions of solids in liquids, dispersions of liquids in liquids, as emulsions, solid mixtures or solid solutions either separately or in combination.

The elastomeric coating composition herein can be prepared by mixing together the various components. Preferably, the elastomeric coating composition is prepared by pre-mixing the component (a) and any resin and/or carrier, prior to adding the other components.

Typically coatings formulations will require a wetting agent or surfactant for the purpose of emulsification, compatibilization of components, leveling, flow and reduction of surface defects. While such components are not required, such further optional additives may provide improvements in the cured or dry film, such as improved abrasion resistance, anti-blocking, hydrophilic, and hydrophobic properties. The coatings formulations of the present invention may exist as solvent-borne coatings, water-borne coatings and/or powder coatings.

The coatings of the present invention may be suitable for use as architectural coatings, OEM product coatings, such as automotive coatings and coil coatings, and special purpose coatings, such as industrial maintenance coatings and marine anti-fouling coatings.

In an aspect, the present invention may be directed to an architectural coating comprising the elastomeric coating composition as described herein. In another aspect, the present invention may be directed to a single coat anti-dirt, and/or anti-stain, and/or anti-fouling coating comprising the elastomeric coating composition as described herein.

In one embodiment, the elastomeric coating composition can be used as a coating that is other than that of a sealant or adhesive for treating a void, crack, joint, or other abscess in the architectural and/or construction field. Accordingly, the present invention may be directed to a coating of a minor amount (i.e., less than 50%) of the substrate surface or a major portion (i.e., greater than 50%) of a substrate surface, such as an architectural element or building façade, to provide for a paint-like coating of the substrate, and not a sealant used in filling or joining the any of abscesses described above or similar ones known to those of ordinary skill in the art.

As used herein the expression "architectural element" denotes a prefabricated or manufactured unit used in building construction, e.g., a window, in particular, an insulated glass unit ("IGU"), a glass-paneled door, doors containing one or more windows, prefabricated windows, sliding doors with one or more windows, folding doors with one or more windows, curtainwall, shop glazing, structural glazing, a skylight, light fixtures, and the like, in which a bonding, bedding glaze, sealant, caulking or adhesive composition is used to bond the glazing to structural elements comprising the "architectural element".

In one embodiment, the substrate can comprise any material that may be on the face of a building or structure that is sought to be waterproofed and/or weather protected, such as concrete, brick, wood, metal, glass, plastic, stone, mortar, painted substrates, and the like.

In another embodiment, the amount of elastomeric coating applied to a substrate can depend on several factors such as the type of substrate, the temperature, the humidity, the desired degree of waterproofing, and the specific parts of the elastomeric coating composition. In one embodiment, the amount of coating is from about 10 to about 0.1 millimeters, preferably from about 5 to about 0.5 millimeters and even more preferably from about 2 to about 0.2 millimeters.

The elastomeric coating compositions can be applied by any means commonly known and used by those skilled in the art, such as for example, brushing, rolling or spraying.

The process of curing a surface (e.g., substrate) coated with the elastomeric coating composition can comprise exposing the elastomeric coating composition to sufficient moisture to provide for curing of the elastomeric coating composition into a cured coating onto the substrate. Such moisture can be applied by methods known to those skilled in the art or can comprise simply exposing the elastomerically-coated surface to atmospheric moisture.

In one other embodiment, the elastomeric coating on the substrate can have a Shore A durometer value per ASTM C-661 of from about 10 to about 60.

In one embodiment, the elastomeric coating on the substrate can have a tensile strength (measured as described herein) of from about 1.0 to about 2.0, preferably from about 1.10 to about 1.60, more preferably from about 1.12 to about 1.45.

In another embodiment, the elastomeric coating on the substrate has an elongation (measured as described herein) of from about 100% to about 400%, preferably from about 140% to about 360% and more preferably from about 150% to about 350%.

In yet another embodiment, the elastomeric coating on the substrate can have a contact angle of from about 70° to about 105° and preferably from about 75° to about 103°.

In still yet another embodiment, the elastomeric coating on the substrate can have one or more of a durability or UV resistance, which is greater than that of a coating of on identical substrate, which is coated with an identical coating composition except wherein only one of either surface wetting agent (b) or filler (c) and not both is present in the coating composition. In one embodiment, the coating on the substrate has a UV resistance of at least about 6 months, preferably at least about 9 months, more preferably at least about one year, even more preferably at least about 5 years. UV resistance is understood to be that the coated substrate does not suffer from visible cracking, pitting, or peeling of the applied coating.

In yet another embodiment, the elastomeric coating on the substrate can provide water proofing protection for a longer period of time than that of coating of an identical substrate, coated with an identical coating composition wherein only one of either surface wetting agent (b) or filler (c), but not both, is present in the coating composition. Water proofing protection can comprise water impermeability. In one embodiment, the period of time can be such as that described for UV resistance.

In yet another embodiment, the elastomeric coating on the substrate can maintains the original appearance of the substrate for a longer time period than that of an identical substrate coated with an identical coating composition wherein only one of either surface wetting agent (b) or filler (c), but not both, is present in the coating composition.

In one embodiment, the elastomeric coating composition of the present invention can provide the substrate with protection against extreme temperatures. An extreme temperature as described herein can be below 40 degrees Fahrenheit, and more specifically below 20 degrees Fahrenheit. In another embodiment herein an extreme temperature as described herein can be above 80 degrees Fahrenheit, specifically above 90 degrees Fahrenheit. The elastomeric coating composition herein can provide such extreme temperature protection for periods such as those described herein for the UV resistance.

In one embodiment, the elastomeric coating on the substrate can have a Dirt Pick Up Resistance (DPUR) as measured by the carbon slurry method described herein of from about 30% to about 95% recovery, preferably from about 33% to about 93% recovery and even more preferably from about 85% to about 93% recovery.

In another embodiment, the elastomeric coating on the substrate can have a DPUR as measured by the carbon slurry method described herein of from about 40% to about 95% recovery, preferably from about 45% to about 93% recovery, more preferably from about 80% to about 93% recovery and even more preferably from about 85% to about 93% recovery.

The elastomeric coating compositions of the present invention can be used as coating materials for buildings, such as building facades, where waterproofing and/or weather protection of the coated material can be used to protect and maintain the original appearance of the building facade.

In a further embodiment, there is provided an emulsion that contains the elastomeric coating composition. In a further embodiment, this emulsion is a non-aqueous silicone emulsion.

In another aspect, the present invention relates to a method of treating a building facade comprising applying to an exterior portion of the building facade the elastomeric coating composition and curing the coating composition to provide a cured coating on the building facade.

There is also provided a building facade containing the cured coating.

The following non-limiting examples further describe and disclose the invention.

EXAMPLES

Example 1

15.44 parts by weight of a hydroxy terminated polydimethylsiloxane polymer having a viscosity of 3,000 centipoise (cps) at 25° C., 16.87 part by weight of a hydroxy terminated polydimethylsiloxane polymer having a viscosity of 30,000 centipoise (cps) at 25° C., 2.18 part by weight of methyltrimethoxysilane were blended in planetary mixer at 75° C. for 1 h in anhydrous condition. 38.06 parts by weight of treated grounded calcium carbonate, 2.02 part by weight of titanium dioxide, 3.68 parts by weight of hexamethyldisilazane treated fumed silica was added to above mixture till a good dispersion was achieved. A de-airing vacuum was applied for 15 minutes. 20.17 parts by weight of CONOSOL C-200 (an aliphatic hydrocarbon solvent, available at Calumet Penreco LLC.), 1.15 parts by weight of Titanium ethylacetoacetate, 0.43 parts by weight of 1,3,5-tris(3-methoxysilylpropyl)isocyanurate were added in above dispersion & mixed under nitrogen.

To evaluate mechanical properties, the mixture was wet drawn at 600 micron thickness on Teflon coated glass plate & dried for 7 days. The film was peeled off and cut in to rectangle strip of 10 mm broad and 50 mm long in length. The mechanical properties were tested using Instron 3365, a mechanical testing machine (available at Instron®) tensile tester. For hardness measurement 10 mm thick film was prepared.

Tensile strength: 1.14 Mpa
Elongation: 340%
Hardness (Shore A): 27
Contact angle: 98.5

To evaluate the DPUR property, the mixture was wet drawn at 300 micron thick film on glass & stored for 7 days at 23° C., 50% relative humidity and then tested as per test method described below.

DPUR test method: Film with desired thickness was drawn on glass plate & dried for 7 days at room temperature. $L_b$ value of film was measured using Gretag Macbeth Color Eye 7000A (available at X-Rite® Inc.). Dry carbon black powder and Carbon-black slurry (15% wt/wt) in water were used as dirt medium and applied on film using brush separately. The films were dried at 50° C. for 1 h using hot air oven followed by washing the film with tap water & cheese cloth for 3 min. Measure the final $L_a$ value of exposed film. Calculate the percentage recovery of whiteness (L) of coating (DPUR) using formula $[100-((L_b-L_a)*100/L_b)]$.

Example 2

81.81 parts by weight of the material from example-1 were taken in mixing container, 9.09 parts by weight of mica (wet processed) and 9.09 parts by weight of MPRL D60 (an aliphatic hydrocarbon solvent, available at Metha Petro Refinary Ltd) were added and mixed for 10 minute using high speed planetary mixture in Nitrogen atmosphere.

To evaluate mechanical properties, the mixture was wet drawn at 600 micron thickness on Teflon coated glass plate & dried for 7 days. The film was peeled off and cut in to rectangle strip of 10 mm broad and 50 mm long in length. The mechanical properties were tested using Instron 3365, a mechanical testing machine (available at Instron®). For hardness measurement 10 mm thick film was prepared.

Tensile strength: 1.40 Mpa
Elongation: 154%
Hardness (Shore A): 55
Contact angle: 101.5

To evaluate the DPUR property, the mixture was wet drawn at 300 micron thickness on glass panel & stored for 7 days at 23° C., 50% relative humidity and then tested as per test method described above.

Example 3

80.57 parts by weight of the material from example-1 were taken in mixing container, 8.95 parts by weight of mica (wet processed), 1.52 parts by weight of SILQUEST A-1230 silane (available from Momentive Performance Materials Inc.) and 8.95 parts by weight of MPRL D60 were added and mixed for 10 minute using high speed planetary mixture in Nitrogen atmosphere.

To evaluate mechanical properties, the mixture was wet drawn at 600 micron thickness on Teflon coated glass plate & dried for 7 days on. The film was peeled off and cut in to rectangle strip of 10 mm broad and 50 mm long in length. The mechanical properties were tested using Instron 3365. For hardness measurement 10 mm thick film was prepared
Tensile strength: 1.41 Mpa
Elongation: 160%
Hardness (Shore A): 54
Contact angle: 79.3

To evaluate the DPUR property, the mixture was wet drawn at 300 micron thickness on glass panel & stored for 7 days at 23° C., 50% relative humidity and then tested as per test method described above.

Example 4

98.48 parts by weight of the material from example-1 were taken in mixing container and 1.52 parts by weight of SILQUEST A-1230 silane were added and mixed for 10 minute using high speed planetary mixture in Nitrogen atmosphere.

To evaluate mechanical properties, the mixture was wet drawn at 600 micron thickness on Teflon coated glass plate & dried for 7 days. The film was peeled off and cut in to rectangle strip of 10 mm broad and 50 mm long in length. The mechanical properties were tested using Instron 3365 tensile tester. For hardness measurement 10 mm thick film was prepared.
Tensile strength: 1.14 Mpa
Elongation: 350%
Hardness (Shore A): 27
Contact angle: 85.5

To evaluate the DPUR property, the mixture was wet drawn at 300 micron thick film on glass & stored for 7 days at 23° C., 50% relative humidity and then tested as per test method described above.

Example 5

80.57 parts by weight of the material from example-1 were taken in mixing container, 8.95 parts by weight of mica (wet processed), 0.626 parts by weight of SILQUEST A-1230 silane, 0.895 parts by weight of SILQUEST A-LINK 35 silane (available from Momentive Performance Materials Inc.) and 8.95 parts by weight of MPRL D60 were added and mixed for 10 minute using high speed planetary mixture in Nitrogen atmosphere.

To evaluate mechanical properties, the mixture was wet drawn at 600 micron thickness on Teflon coated glass plate & dried for 7 days. The film was peeled off and cut in to rectangle strip of 10 mm broad and 50 mm long in length. The mechanical properties were tested using Instron 3365. For hardness measurement 10 mm thick film was prepared.

To evaluate the DPUR property, the mixture was wet drawn at 300 micron thick film on glass & stored for 7 days at 23° C., 50% relative humidity and then tested as per test method described above
Tensile Strength: 1.44 Mpa
Elongation: 156%
Hardness (Shore A): 57
Contact Angle: 82

Example 6

80.57 parts by weight of material from example-1 were taken in mixing container, 8.95 parts by weight of mica (wet processed), 1.52 parts by weight of dihydroxy terminated ethylene oxide polymer (Molecular weight 400 Dalton) and 8.95 parts by weight of MPRL D60 were added and mixed for 10 minute using high speed planetary mixture in Nitrogen atmosphere.

To evaluate the DPUR property, the mixture was wet drawn at 300 micron thick film on glass & stored for 7 days at 23° C., 50% relative humidity and then tested as per test method described above.
Tensile Strength: NM
Elongation: NM
Hardness (Shore A): 52
Contact Angle: 78-85 approximately
NM=not measured Example 7

80.57 parts by weight of material from example-1 were taken in mixing container, 8.95 parts by weight of mica (wet processed), 0.626 parts by weight of dihydroxy terminated ethylene oxide polymer (Molecular weight 400 Dalton), 0.895 parts by weight of SILQUEST A-LINK 35 silane and 8.95 parts by weight of MPRL D60 were added and mixed for 10 minute using high speed planetary mixture in Nitrogen atmosphere.

To evaluate the DPUR property, the mixture was wet drawn at 300 micron thick film on glass & stored for 7 days at 23° C., 50% relative humidity and then tested as per test method described above.
Tensile Strength: NM
Elongation: NM
Hardness (Shore A): 55
Contact Angle: 79-85 approximately Example 8

81.88 parts by weight of material from example-1 were taken in mixing container, 9.09 parts by weight of 3M™ Ceramic Microspheres, W-210 (solid, white-colored, fine spherical particles with a typical whiteness (L Value) of 95 or greater and a particle size of 3 microns, used in architectural paint from 3M India Limited) and 9.09 parts by weight of MPRL D60 were added and mixed for 10 minute using high speed planetary mixture in Nitrogen atmosphere.

To evaluate the DPUR property, the mixture was wet drawn at 300 micron thick film on glass & stored for 7 days at 23° C., 50% relative humidity and then tested as per test method described above.
Tensile Strength: NM
Elongation: NM
Hardness (Shore A): 55
Contact Angle: 98 to 102 approximately Example 9

80.57 parts by weight of material from example-1 were taken in mixing container, 8.95 of 3M™ Ceramic Microspheres, W-210 (solid, white-colored, fine spherical particles with a typical whiteness (L Value) of 95 or greater and a particle size of 3 microns, used in architectural paint) from 3M company, 1.52 parts by weight non-ionic polymeric fluorochemical surfactant, FC 4430 from 3M company and 8.95 parts by weight of MPRL D60 were added and mixed for 10 minute using high speed planetary mixture in Nitrogen atmosphere.

To evaluate the DPUR property, the mixture was wet drawn at 300 micron thick film on glass & stored for 7 days at 23° C., 50% relative humidity and then tested as per test method described above.

Tensile Strength: NM
Elongation: NM
Hardness (Shore A): 55
Contact Angle: 98 to 102 approximately Example 10

80.57 parts by weight of material from example-1 were taken in mixing container, 8.95 parts by weight of 3M™ Ceramic Microspheres, W-210 (solid, white-colored, fine spherical particles with a typical whiteness (L Value) of 95 or greater and a particle size of 3 microns, used in architectural paint) from 3M company, 1.52 parts by weight non-ionic polymeric fluorochemical surfactant, FC 4434 from 3M company and 8.95 parts by weight of MPRL D60 were added and mixed for 10 minute using high speed planetary mixture in Nitrogen atmosphere.

To evaluate the DPUR property, the mixture was wet drawn at 300 micron thick film on glass & stored for 7 days at 23° C., 50% relative humidity and then tested as per test method described above.
Tensile Strength: NM
Elongation: NM
Hardness (Shore A): 55
Contact Angle: 98-102 approximately Example 11

80.57 parts by weight of material from example-1 were taken in mixing container, 8.95 parts by weight of mica (wet processed), 1.52 parts by weight of SILQUEST A-LINK 35 silane and 8.95 parts by weight of MPRL D60 were added and mixed for 10 minute using high speed planetary mixture in Nitrogen atmosphere.

To evaluate the DPUR property, the mixture was wet drawn at 300 micron thick film on glass & stored for 7 days at 23° C., 50% relative humidity and then tested as per test method described above.
Tensile Strength: NM
Elongation: NM
Hardness (Shore A): 57
Contact Angle: 95-101 approximately Example 12

80.57 parts by weight of material from example-1 were taken in mixing container, 8.95 parts by weight of mica (dry processed), 1.52 parts by weight of SILQUEST A-1230 silane and 8.95 parts by weight of MPRL D60 were added and mixed for 10 minute using high speed planetary mixture in Nitrogen atmosphere.

To evaluate the DPUR property, the mixture was wet drawn at 300 micron thick film on glass & stored for 7 days at 23° C., 50% relative humidity and then tested as per test method described above.
Tensile Strength: NM
Elongation: NM
Hardness (Shore A): 52
Contact Angle: 80-90 approximately Example 13

A mixture of 8.8 parts by weight mica (wet processed) and 0.8 parts by weight polyether functionalized PDMS was mixed in a speed mixer for 10 minutes at 2350 RPM and the mixture is mixed with 90.4 parts by weight of material from example-1 for 10 minute using high speed planetary mixture in Nitrogen atmosphere.

To evaluate the DPUR property, the mixture was wet drawn at 300 micron thick film on glass & stored for 7 days at 23° C., 50% relative humidity and then tested as per test method described above.

Example 14

A mixture of 8.8 parts by weight mica (wet processed) and 1.2 parts by weight polyether functionalized PDMS was mixed in a mixer for 10 minutes at 2350 RPM and the mixture was mixed with 90 parts by weight of material from example-1 for 10 minute using high speed planetary mixture in Nitrogen atmosphere.

To evaluate the DPUR property, the mixture was wet drawn at 300 micron thick film on glass & stored for 7 days at 23° C., 50% relative humidity and then tested as per test method described above.

Example 15

A mixture of 8.8 parts by weight mica (wet processed) and 1.2 parts by weight Polyether functionalized trisiloxane was mixed in a mixer for 10 minutes at 2350 RPM and the mixture is mixed with 90 parts by weight of material from example-1 for 10 minute using high speed planetary mixture in Nitrogen atmosphere.

To evaluate the DPUR property, the mixture was wet drawn at 300 micron thick film on glass & stored for 7 days at 23° C., 50% relative humidity and then tested as per test method described above.

Example 16

A mixture of 8 parts by weight mica (wet processed) and 4 parts by weight Low Mol. Wt. hydroxy stopped PDMS was mixed in a mixer for 10 minutes at 2350 RPM and the mixture was mixed with 88 parts by weight of material from example-1 for 10 minute using high speed planetary mixture in Nitrogen atmosphere.

To evaluate the DPUR property, the mixture was wet drawn at 300 micron thick film on glass & stored for 7 days at 23° C., 50% relative humidity and then tested as per test method described above.

Example 17

A mixture of 8 parts by weight mica (wet processed) and 8 parts by weight Low Mol. Wt. hydroxy stopped PDMS was mixed in a mixer for 10 minutes at 2350 RPM and the mixture was mixed with 84 parts by weight of material from example-1 for 10 minute using high speed planetary mixture in Nitrogen atmosphere.

To evaluate the DPUR property, the mixture was wet drawn at 300 micron thick film on glass & stored for 7 days at 23° C., 50% relative humidity and then tested as per test method described above.

Example 18

A mixture of 8 parts by weight mica (wet processed) and 10 parts by weight high mol. wt. hydroxy stopped PDMS (viscosity of 30,000 cps) was mixed in a mixer for 10 minutes at 2350 RPM and the mixture was mixed with 82 parts by weight of material from example-1 for 10 minute using high speed planetary mixture in Nitrogen atmosphere.

To evaluate the DPUR property, the mixture was wet drawn at 300 micron thick film on glass & stored for 7 days at 23° C., 50% relative humidity and then tested as per test method described above.

Example 19

A mixture of 8 parts by weight mica (wet processed) and 8 parts by weight eugenol stopped PDMS was mixed in a mixer for 10 minutes at 2350 RPM and the mixture was mixed with 84 parts by weight of material from example-1 for 10 minute using high speed planetary mixture in Nitrogen atmosphere.

To evaluate the DPUR property, the mixture was wet drawn at 300 micron thick film on glass & stored for 7 days at 23° C., 50% relative humidity and then tested as per test method described above.

Example 20-24

A mixture of 8 parts by weight mica (wet processed) and 2/4/8/10 parts by weight Dimethoxy-methyl stopped PDMS, respectively for Examples 21-25 was mixed in a mixer for 10 minutes at 2350 RPM and the mixture was mixed with 90/88/81/82 parts by weight of material from Example-1, respectively for Examples 20-24, for 10 minute using high speed planetary mixture in Nitrogen atmosphere.

To evaluate the DPUR property, the mixture was wet drawn at 300 micron thick film on glass & stored for 7 days at 23° C., 50% relative humidity and then tested as per test method described above except that cheese cloth rubbing is not done in slurry method.

DPUR Results:

TABLE 1

| Example | Percentage recovery of whiteness (DPUR) (Carbon slurry method) | Percentage recovery of whiteness (DPUR) (Dry Carbon method) |
| --- | --- | --- |
| Example-1 | 39.526 | 47.28 |
| Example-2 | 67.79 | 75.83 |
| Example-3 | 89.26 | 90.27 |
| Example-4 | 56.79 | 57.490 |
| Example-5 | 92.397 | 93.159 |
| Example-6 | 75.353 | 82.23 |
| Example-7 | 66.269 | 76.324 |

TABLE 1-continued

| Example | Percentage recovery of whiteness (DPUR) (Carbon slurry method) | Percentage recovery of whiteness (DPUR) (Dry Carbon method) |
| --- | --- | --- |
| Example-8 | 48.580 | 61.865 |
| Example-9 | 50.378 | 63.74 |
| Example-10 | 49.622 | 58.579 |
| Example-11 | 71.361 | 72.873 |
| Example-12 | 65.80 | 82.658 |
| Example-13 | 88.74 | 96.3 |
| Example-14 | 78.27 | 99.1 |
| Example-15 | 90.14 | 95.4 |
| Example-16 | 94.98 | 100 |
| Example-17 | 99.94 | 100 |
| Example-18 | 95.65 | 100 |
| Example-19 | 100 | 100 |
| Example-20 | 92.35 | 100 |
| Example-21 | 93.06 | 100 |
| Example-22 | 97.18 | 100 |
| Example-23 | 96.94 | 100 |
| Example-24 | 96.52 | 100 |

DPUR Test with UV Exposure:

The films are prepared for DPUR test as explained in Example 1 and after curing for 7 days its exposed to UV environment with UVTest Fluorescent/UV instrument from Atlas, using UVA lamps with irradiance of 0.89 W/(m2-nm) for 4 hrs. and the whiteness recovery is shown in below table:

TABLE 2

| Example | Percentage recovery of whiteness (DPUR) (Carbon slurry method) | Percentage recovery of whiteness (DPUR) (Dry Carbon method) |
| --- | --- | --- |
| Example-20 | 90.94 | 91.07 |
| Example-21 | 67.36 | 70.56 |
| Example-22 | 96.77 | 97.53 |
| Example-23 | 97.17 | 96.89 |
| Example-24 | 96.32 | 96.48 |

Stain Resistance Results:

The mixtures were wet drawn at 300 micron thick film on Leneta sheet (available at Leneta Company Inc.) and dried for 7 days at 23° C. Different stains were applied on the substrate and dried for 24 h at 25° C. The stains were washed with tap water using soft scrub pad. The rating was provided based on the cleanness of surface with respect to stain.

TABLE 3

| | Type of stains & rating (0 = worst, 5 = best) | | | | | | |
| --- | --- | --- | --- | --- | --- | --- | --- |
| Example | Pickle | Crayon | Tea | Pencil | Coffee | Ball pen | Turmeric |
| Example-1 | 3 | 3 | 5 | 2 | 2 | 3 | 1 |
| Example-3 | 5 | 5 | 5 | 4.5 | 4 | 5 | 5 |
| Example-5 | 5 | 5 | 5 | 5 | 4 | 5 | 5 |
| Commercial elastomeric control | 4 | 1 | 5 | 1 | 4.5 | 1 | 1.5 |

Acid/Base Resistance Results:

Acid/base water and paste were applied on the substrates and dried for 24 h at room temperature. The stains were washed with water with mild rubbing. The results are mentioned below:

TABLE 4

| Example | Acid/base resistance coating (0 = worst, 5 = best) | | |
|---|---|---|---|
| | pH 4 | pH 1 | pH 9 |
| Example-1 | 4 | 2 | 4 |
| Example-3 | 4 | 3.5 | 4.5 |
| Example-5 | 4 | 3.5 | 4.5 |
| Commercial elastomeric control | 1 | 0 | 4 |

Viscosity & Spreading Rate:

Better spreading rate was observed for the inventive formulation

TABLE 5

| Example | Viscosity (Pas) | Spreading rate (sqf/kg) |
|---|---|---|
| Example-1 | 5.76 | 47.602 |
| Example-2 | 5.85 | 52.743 |
| Example-3 | 5.80 | 55.643 |
| Example-5 | 5.85 | 55.534 |
| Commercial elastomeric coating | 4.50 | 63.802 |

Fatigue Test Results for Elastomeric Coatings:

During change in temperature over time concrete structure develop cracks due to expansion & contraction. This test was conducted to understand the resilience of the elastomeric coating during repeated stress & relax cycle. This test represents the durability of coating during expansion & contraction of concrete substrate. The test was conducted at 50% repeated elongation of its original length & relaxing cycle using Instron 3365. Passing more cycle represents better performance of coating.

Formulation of Example 3 & commercial elastomeric paint was wet drawn at 600 micron thickness on Teflon coated glass plate & dried for 7 days. The film was peeled off and cut in to rectangle strip of 10 mm broad and 20 mm long in length. Test was stopped after 20 cycles.

TABLE 6

| Example | Repeated stress-strain cycle at 50% elongation of original length | | | |
|---|---|---|---|---|
| | Cycle 1 | Cycle 2 | Cycle 3 | Cycle 20 |
| Commercial elastomeric coating | Passed | Failed (Film got broken during stress) | — | |
| Example-3 | Passed | Passed | Passed | Passed |
| Example-5 | Passed | Passed | Passed | Passed |
| Example-1 | Passed | Passed | Passed | Passed |

While the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention but that the invention will include all embodiments falling within the scope of the appended claims.

The invention claimed is:

1. An elastomeric coating composition comprising:
    a) at least one condensation polymerization-effective polymer bearing two or more silicon atoms of formula (I);

$$M^1_a M^2_b M^3_c M^4_d D^1_e D^2_f D^3_g D^4_h \quad (I)$$

wherein:
    $M^1 = R^1 R^2 R^3 SiO_{1/2}$
    $M^2 = R^4 R^5 R^6 SiO_{1/2}$
    $M^3 = R^7 R^8 R^9 SiO_{1/2}$
    $M^4 = R^{10} R^{11} R^{12} SiO_{1/2}$
    $D^1 = R^{13} R^{14} SiO_{2/2}$
    $D^2 = R^{15} R^{16} SiO_{2/2}$
    $D^3 = R^{17} R^{18} SiO_{2/2}$
    $D^4 = R^{19} R^{20} SiO_{2/2}$ wherein, $R^1$ and $R^{13}$ are each independently an aliphatic group or an aromatic group having from 1 to 60 carbon atoms, an OH or —H or $OR^{25}$, where $R^{25}$ is an aliphatic or aromatic group having from 1 to 60 carbon atoms;
    $R^2, R^3, R^5, R^6, R^8, R^9, R^{10}, R^{11}, R^{12}, R^{14}, R^{16}, R^{18}, R^{19}$ and $R^{20}$, are each independently an aliphatic or aromatic group having from 1 to 60 carbon atoms;
    $R^4$ and $R^{15}$ are each independently of the formula:
    $$—(C_nH_{2n})—O—(C_2H_4O)_o—(C_3H_6O)_p—(C_4H_8O)_q—R^{26},$$
    where $R^{26}$ is a hydrogen or an aliphatic or aromatic group having from 1 to 60 carbon atoms, n is 0 to 6, o is 0 to 100, p is 0 to 100 and q is 0 to 50, provided o+p+q≥0;
    $R^7$ and $R^{17}$ are each independently a branched, linear or cyclic, saturated or unsaturated alkyl group having from 4 to 36 carbon atoms, and
    the subscripts a, b, c, d, e, f, g, h are each independently zero or a positive integer, and provided that a+b+c+d+e+f+g+h≥2, and a+b+c+d=2, and a+e≥2, and
    provided that the polymer of formula (I) contains at least two groups selected from —OH, —$OR^{25}$ and combinations thereof;
    b) a surface wetting agent chosen from a polyalkylene oxide-containing silane which contains an aliphatic hydrocarbon moiety between a silicon atom and a polyalkylene oxide moiety in the polyalkylene oxide-containing silane, a heteroatom-containing silane, a functionalized organosiloxane and, combinations thereof;
    c) at least one filler; and,
    d) a condensation catalyst.

2. The elastomeric coating composition of claim 1 wherein the at least one condensation polymerization-effective polymer bearing two or more silicon atoms (a) is selected from the group consisting of a hydroxyl-terminated polydimethylsiloxane, an alkoxy-terminated polydimethylsiloxane and combinations thereof.

3. The elastomeric coating composition of claim 1 wherein the at least one condensation polymerization-effective polymer bearing two or more silicon atoms (a) is a silanol-terminated polydiorganosiloxane wherein the organo moieties are each independently alkyl groups from 1 to about 6 carbon atoms.

4. The elastomeric coating composition of claim 1 wherein the surface wetting agent (b) is a polyalkylene oxide-containing silane chosen from the general formulae (II) and/or (III) wherein formula (II) is:

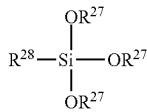

where $R^{27}$ is independently selected from. an alkyl group having from 1 to about 12 carbon atoms;
$R^{28}$ is a moiety selected from:

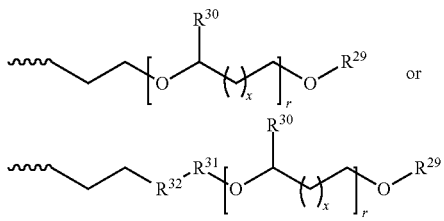

wherein ⌇⌇⌇ represents a bond to the silicon atom of the structure of formula (II);
$R^{29}$ is independently chosen from a hydrogen or an alkyl group having from 1 to about 4 carbon atoms, or —$COR^{33}$;
$R^{33}$ is independently chosen from hydrogen or an alkyl group having from 1 to about 16 carbon atoms;
$R^{30}$ is independently chosen from hydrogen or an alkyl group having from 1 to about 4 carbon atoms;
$R^{31}$ is independently chosen from a divalent alkylene group having from 1 to about 4 carbon atoms;
$R^{32}$ is independently chosen from a divalent urethane, acrylamide, amide or urea group; and,
r is from 1 to about 100 and x is zero or 1;
wherein Formula (III):

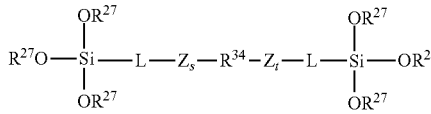

where $R^{27}$ is as previously defined;
Z is independently chosen from a divalent urethane, acrylamide, amide or urea group;
s and t are independently integers from 0 to 2;
L is independently chosen from a divalent aliphatic linear hydrocarbon group having from 2 to about 15 carbon atoms, and may optionally have an oxygen or nitrogen atom at one or both valences;
$R^{34}$ is defined by the general formula (IV):

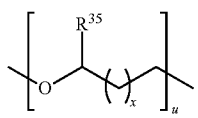

wherein $R^{35}$ is independently chosen from hydrogen or an alkyl group having from 1 to 4 carbon atoms; x is as previously defined; and,
u is an integer from 1 to about 100.

5. The elastomeric coating composition of claim 1 wherein the surface wetting agent (b) is selected from the group consisting of:
a functionalized organosiloxane of the general formula (V):

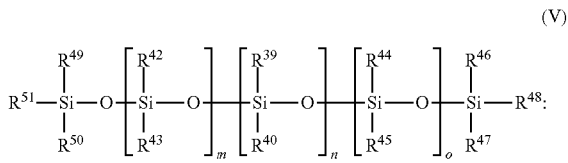

wherein $R^{39}$, $R^{42}$, $R^{43}$, $R^{44}$, $R^{45}$, $R^{46}$, $R^{47}$, $R^{49}$ and $R^{50}$ are independently chosen from hydrogen, an alkyl group containing from 1 to about 10 carbon atoms, or an alkoxy group containing from 1 to about 10 carbon atoms;
$R^{40}$ is chosen from hydrogen, an alkyl group containing from 1 to about 10 carbon atoms, an alkoxy group containing from 1 to about 10 carbon atoms, a heteroatom-containing compound containing from 1 to about 10 carbon atoms, wherein m, n and o are each independently integers from 0 to about 1000; and
a compound of the general formula (VII)

wherein $R^{41}$ is independently chosen from hydrogen or an alkyl group having from 1 to about 10 carbon atoms or a heteroatom-containing compound having from 1 to about 10 carbon atoms;
Z is a heteroatom, and the j, k and l are each independently an integer from 0 to about 10, and
$R^{48}$ and $R^{51}$ are independently chosen from a hydrogen or hydroxyl group or an alkyl or alkoxy group having from 1 to about 10 carbon atoms or a substituted or unsubstituted aromatic compound containing from 6 to about 20 carbon atoms.

6. The elastomeric coating composition of claim 1 wherein the surface wetting agent (b) is one or more selected from the group consisting of an ethylene oxide and/or propylene oxide containing silane; a functional siloxane selected from the group consisting of polyether-functionalized polydimethysiloxane, polyether-functionalized trisiloxane, low molecular weight-terminated polydimethysiloxane having viscosity from 2,000 to 10,000 cps, high molecular weight-terminated polydimethylsiloxane having viscosity from 30,000 to 40,000 cps, eugenol-terminated polydimethylsiloxane, dimethoxy-methyl-terminated polydimethylsiloxane, methyl-terminated polydimethylsiloxane, and combinations thereof.

7. The elastomeric coating composition of claim 1 wherein the filler (c) is a layered structural filler selected from the group consisting of clays, nano-clays, organoclays, ground calcium carbonate, precipitated calcium carbonate, colloidal calcium carbonate, calcium carbonate treated with compounds containing a stearate moiety or stearic acid, fumed silica, precipitated silica, crushed quartz, ground quartz, alumina, aluminum hydroxide, titanium hydroxide, kaolin, bentonite, montmorillonite, diatomaceous earth, iron oxide, carbon black and graphite, talc, mica, pumice, wollastonite, ceramic, glass beads, PTFE, and combinations thereof.

8. The elastomeric coating composition of claim 1 wherein the filler (c) is a wet-processed filler.

9. The elastomeric coating composition of claim 1 wherein the filler (c) is mica.

10. The elastomeric coating composition of claim 1 wherein the surface wetting agent (b) is an ethylene oxide and/or propylene oxide containing silane and the filler (c) is mica.

11. The elastomeric coating composition of claim 1 wherein the condensation catalyst (d) is a titanium catalyst.

12. The elastomeric coating composition of claim 1 wherein the condensation catalyst (d) is di-isopropyl titanium bisacetylacetonate.

13. The elastomeric coating composition of claim 1 further comprising a crosslinking agent (e).

14. The elastomeric coating composition of claim 13 wherein the crosslinking agent (e) is selected from the group consisting of alkoxy silane, epoxy silane, mercapto silane, acrylate silane, methacryloxy silane, vinyl silane, isocyanato silane, and combinations thereof.

15. The elastomeric coating composition of claim 14 wherein the crosslinking agent (e) is methyltrimethoxysilane.

16. The elastomeric coating composition of claim 1 further comprising an adhesion promoter selected from an isocyanato silane chosen from tris[3-(trimethoxysilyl)propyl]isocyanurate, 3-isocyanatopropyltrimethoxysilane, α-isocyanatomethyltrimethoxysilane, β-isocyanatoethyltrimethoxysilane, γ-isocyanatopropyltrimethoxysilane, α-isocyanatomethyltriethoxysilane, β-isocyanatoethyltriethoxysilane, and μ-isocyanatopropyltriethoxysilane, 1,3,5-tris(trimethoxysilylpropyl)isocyanurate, N-(beta-aminoethyl)-gamma-aminopropyltrimethoxysilane, N-ethyl-gammaaminoisobutyl Trimethoxysilane, Bis-[gamma-(trimethoxysilyl)propyl]amine, Bis-[Gamma-(triethoxysilyl)propyl]amine, gamma-aminopropyltrimethoxysilane, gamma-aminopropyltriethoxysilane, aminopropyltrimethoxysilane, N-Phenyl-gamma-aminopropyltrimethoxysilane, triaminofunctionaltrimethoxysilane, gamin a-aminopropylmethyldiethoxysilane, gamma-aminopropylmethyldiethoxysilane, methacryloxypropyltrimethoxysilane, methylaminopropyltrimethoxysilane, gamma-glycidoxypropylethyldimethoxysilane, gamma-glycidoxypropyltrimethoxysilane, gamma-glycidoxyethyltrimethoxysilane, beta-(3,4-epoxycyclohexyl)propyltrimethoxysilane, beta-(3,4-epoxycyclohexy)ethylmethyldimethoxysilane, isocyanatopropyltriethoxysilane, isocyanatopropylmethyldimethoxysilane, beta-cyanoethyltrimethoxysilane, gamma-acryloxypropyltrimethoxysilane, gamma-methacryloxypropylmethyldimethoxysilane, 4-amino-3,3-dimethylbutyltrimethoxysilane, n-ethyl-3-trimethoxysilyl-2-methylpropanamine or combination thereof.

17. The elastomeric coating composition of claim 1 further comprising an adhesion promoter wherein the adhesion promoter is an isocyanato silane having the general formula (VI):

(VI)

wherein $R^{37}$ is a divalent alkylene group from 1 to 10 carbon atoms, $R^{38}$ is a monovalent hydrocarbon residue having from 1 to about 10 carbon atoms, each Y is independently selected from the group consisting of a halogen atom, an alkoxy group having from 1 to about 10 carbon atoms and an acyloxy group having from 1 to about 10 carbon atoms, and v is from 1 to 3.

18. An architectural coating comprising the elastomeric coating composition of claim 1.

19. A single coat anti-dirt and/or anti-stain and/or anti-fouling coating comprising the elastomeric coating composition of claim 1.

20. An elastomeric coating composition consisting essentially of:
a) at least one condensation polymerization-effective polymer bearing two or more silicon atoms of formula (I);

 (I)

wherein:
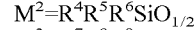
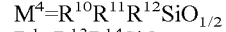
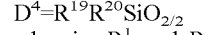

wherein, $R^1$ and $R^{13}$ are each independently an aliphatic group or an aromatic group having from 1 to 60 carbon atoms, an OH or —H or $OR^{25}$, where $R^{25}$ is an aliphatic or aromatic group having from 1 to 60 carbon atoms;

$R^2, R^3, R^5, R^6, R^8, R^9, R^{10}, R^{11}, R^{12}, R^{14}, R^{16}, R^{18}, R^{19}$ and $R^{20}$, are each independently an aliphatic or aromatic group having from 1 to 60 carbon atoms;

$R^4$ and $R^{15}$ are each independently of the formula:
—$(C_nH_{2n})$—O—$(C_2H_4O)_o$—$(C_3H_6O)_p$—$(C_4H_8O)_q$—$R^{26}$, where $R^{26}$ is a hydrogen or an aliphatic or aromatic group having from 1 to 60 carbon atoms, n is 0 to 6, o is 0 to 100, p is 0 to 100 and q is 0 to 50, provided o+p+q≥0;

$R^7$ and $R^{17}$ are each independently a branched, linear or cyclic, saturated or unsaturated alkyl group having from 4 to 36 carbon atoms, and the subscripts a, b, c, d, e, f, g, h are each independently zero or a positive integer, and provided that a+b+c+d+e+f+g+h≥2, and a+b+c+d=2, and a+e≥2, and provided that the polymer of formula (I) contains at least two groups selected from —OH, —$OR^{25}$ and combinations thereof;

b) a surface wetting agent chosen from a polyalkylene oxide-containing silane which contains an aliphatic hydrocarbon moiety between a silicon atom and a polyalkylene oxide moiety in the polyalkylene oxide-containing silane, a heteroatom-containing silane, a functionalized organosiloxane and, combinations thereof;

c) at least one filler; and, d) a condensation catalyst.

21. A method of preparing an elastomeric coating composition comprising combining:
a) at least one condensation polymerization-effective polymer bearing two or more silicon atoms of formula (I);

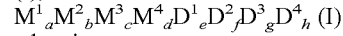 (I)

wherein:
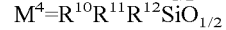

$D^1 = R^{13}R^{14}SiO_{2/2}$
$D^2 = R^{15}R^{16}SiO_{2/2}$
$D^3 = R^{17}R^{18}SiO_{2/2}$
$D^4 = R^{19}R^{20}SiO_{2/2}$ wherein, $R^1$ and $R^{13}$ are each independently an aliphatic group or an aromatic group having from 1 to 60 carbon atoms, an OH or —H or $OR^{25}$, where $R^{25}$ is an aliphatic or aromatic group having from 1 to 60 carbon atoms;

$R^2$, $R^3$, $R^5$, $R^6$, $R^8$, $R^9$, $R^{10}$, $R^{11}$, $R^{12}$, $R^{14}$, $R^{16}$, $R^{18}$, $R^{19}$ and $R^{20}$, are each independently an aliphatic or aromatic group having from 1 to 60 carbon atoms;

$R^4$ and $R^{15}$ are each independently of the formula:
-$(C_nH_{2n})$-O-$(C_2H_4O)_o$-$(C_3H_6O)_p$-$(C_4H_8O)_q$-$R^{26}$,
where $R^{26}$ is a hydrogen or an aliphatic or aromatic group having from 1 to 60 carbon atoms, n is 0 to 6, o is 0 to 100, p is 0 to 100 and q is 0 to 50, provided o+p+q>0;

$R^7$ and $R^{17}$ are each independently a branched, linear or cyclic, saturated or unsaturated alkyl group having from 4 to 36 carbon atoms, and the subscripts a, b, c, d, e, f, g, h are each independently zero or a positive integer, and provided that a+b+c+d+e+f+g+h ≥2, and a+b+c+d=2, and a+e≥2, and provided that the polymer of formula (I) contains at least two groups selected from —OH, —$OR^{25}$ and combinations thereof; b) a surface wetting agent selected from the group consisting of a polyalkylene oxide-containing silane which contains an aliphatic hydrocarbon moiety between a silicon atom and a polyalkylene oxide moiety in the polyalkylene oxide-containing silane, a heteroatom-containing silane, a functionalized organosiloxane and, combinations thereof; c) at least one filler; and, d) a condensation catalyst.

* * * * *